United States Patent
Watanabe et al.

(10) Patent No.: US 8,926,022 B2
(45) Date of Patent: Jan. 6, 2015

(54) VEHICLE FRAME COMPONENT AND MANUFACTURING METHOD FOR VEHICLE FRAME COMPONENT

(75) Inventors: Takuji Watanabe, Toyota (JP); Kazuaki Hayase, Toyota (JP)

(73) Assignees: Toyota Boshoku Kabushiki Kaisha, Aichi-Ken (JP); Chiyoda Kogyo Co., Ltd., Aichi-Ken (JP)

( * ) Notice: Subject to any disclaimer, the term of this patent is extended or adjusted under 35 U.S.C. 154(b) by 174 days.

(21) Appl. No.: 13/550,773

(22) Filed: Jul. 17, 2012

(65) Prior Publication Data
US 2014/0021766 A1    Jan. 23, 2014

(51) Int. Cl.
*A47C 7/02* (2006.01)

(52) U.S. Cl.
USPC .................................. 297/452.2; 297/452.18

(58) Field of Classification Search
USPC ............................... 297/452.18, 452.2, 463.2
See application file for complete search history.

(56) References Cited

U.S. PATENT DOCUMENTS

| | | | |
|---|---|---|---|
| 6,132,003 A * | 10/2000 | Sakurai et al. | 297/452.18 |
| 6,375,267 B1 * | 4/2002 | Ishikawa | 297/452.18 |
| 6,869,145 B2 * | 3/2005 | Matsunuma | 297/452.18 |
| 7,731,292 B2 * | 6/2010 | Ishijima et al. | 297/452.18 |
| 2008/0164743 A1 * | 7/2008 | Robert et al. | 297/452.2 |

FOREIGN PATENT DOCUMENTS

| | | |
|---|---|---|
| JP | 2010-131640 | 6/2010 |
| JP | 2010-149174 | 7/2010 |
| JP | 2012-158231 | * 8/2012 |

OTHER PUBLICATIONS

Office Action in JP 2011-018372, with partial English Language translation, issued Jul. 1, 2014.

* cited by examiner

*Primary Examiner* — Philip Gabler
(74) *Attorney, Agent, or Firm* — Greenblum & Bernstein, P.L.C.

(57) ABSTRACT

A vehicle frame component has two side wall portions arranged to face each other and a connecting portion that connects edges of the two side wall portions, and that forms a framework of a vehicle component. A connecting-side protruding portion that protrudes into a space between the two side wall portions while extending along a direction in which the connecting portion extends is formed in at least part of the connecting portion, and at least part of the connecting portion is formed in a shape in which the connecting portion is curved in an arcuate shape and leaned in a direction opposite to a direction in which the connecting-side protruding portion protrudes.

3 Claims, 7 Drawing Sheets

VEHICLE FRAME COMPONENT AND MANUFACTURING METHOD FOR VEHICLE FRAME COMPONENT

BACKGROUND OF THE INVENTION

1. Field of the Invention

The invention relates to a vehicle frame component used as a frame of a vehicle component, such as a vehicle seat frame and a vehicle body frame, and a manufacturing method for the vehicle frame component.

2. Description of Related Art

In recent years, there are known vehicles as typified by minivans, in which three rows of vehicle seats are arranged in the vehicle longitudinal direction. Among these three-row vehicle seats, the third-row seat is arranged behind the second-row seat. At the third-row seat, a knee space for an occupant seated in the third-row seat is likely to be narrow. Therefore, it is desirable that a widest possible knee space be ensured for an occupant seated in the third-row seat. Accordingly, there is a known back frame of such a second-row seat, which is curved rearward in an arcuate shape from a lower back portion toward a back portion (for example, see Japanese Patent Application Publication No. 2010-131640 (JP 2010-131640A)). When the back frame is curved to be bowed in an arcuate shape in this way, it is possible to arrange the lower back portion of the second-row seat forward. Therefore, it is possible to increase the knee space for an occupant seated in the third-row seat. Note that the back frame is curved rearward such that the back frame is bowed in an arcuate shape from the lower back portion toward the back portion, through a drawing process in press working. Specifically, a steel sheet is deformed into a curved shape of the back frame by drawing the steel sheet such that the steel sheet is bowed in an arcuate shape through the drawing process in press working.

Note that, nowadays, a high-tensile steel sheet having an extremely high strength is more likely to be selected as the material of a vehicle frame component, such as the above-described back frame. Because such a high-tensile steel sheet has an extremely high strength, if the high-tensile steel sheet is subjected to the above-described drawing process to be bowed in an arcuate shape, wrinkles are formed in the high-tensile steel sheet. Once wrinkles are formed in the high-tensile steel sheet in this way, the wrinkles may interfere with another component or the wrinkles may decrease the strength of the vehicle frame component. Therefore, formation of such wrinkles in the vehicle frame component should be avoided.

SUMMARY OF THE INVENTION

The invention is made in light of the above-described circumstances, and it is an object of the invention to, even when a steel sheet (for example, high-tensile steel sheet) having an extremely high strength is selected as the material of a vehicle frame component, provide a formed product curved in a fine arcuate shape without forming wrinkles in the steel sheet, as the vehicle frame component.

The vehicle frame component according to a first aspect of the invention employs the following means. That is, a vehicle frame component according to the first aspect of the invention has two side wall portions arranged to face each other and a connecting portion that connects edges of the two side wall portions, and forms a framework of a vehicle component. A connecting-side protruding portion that protrudes into a space between the two side wall portions while extending along the direction in which the connecting portion extends is formed in at least part of the connecting portion, and at least part of the connecting portion is formed in a shape in which at least part of the connecting portion is curved in an arcuate shape and leaned in the direction opposite to the direction in which the connecting-side protruding portion protrudes. With the vehicle frame component according to the first invention, at least part of the connecting portion has a curved and bowed arcuate shape. Therefore, when the vehicle frame component is used as a back frame of a vehicle seat, it is possible to provide a wide knee space for a rear seat due to the curved and bowed arcuate shape. Here, with the vehicle frame component according to the first aspect of the invention, the connecting-side protruding portion that protrudes into the space between the two side wall portions while extending along the direction in which the connecting portion extends is formed in at least part of the connecting portion. Therefore, even when a steel sheet having an extremely high strength is selected as the material of the vehicle frame component and is then curved and bowed in an arcuate shape to be formed into the vehicle frame component, it is possible to cause a redundant portion produced through this formation to protrude into a space between the two side wall portions as the connecting-side protruding portion. In this way, when the vehicle frame component is formed so as to be curved and bowed in an arcuate shape, it is possible to relieve the redundant portion so that wrinkles are not formed in the vehicle frame component. Therefore, even when a steel sheet having an extremely high strength (for example, high-tensile steel sheet) is selected as the material of the vehicle frame component, it is possible to produce a formed product curved in a fine arcuate shape without forming wrinkles in the high-tensile steel sheet.

In the vehicle frame component according to the first aspect of the invention, side wall-side protruding portions that protrude in opposite directions may be formed in the two respective side wall portions over a range, in which the connecting-side protruding portion is formed, at positions near the connecting portion. With the vehicle frame component, it is possible to cause the side wall-side protruding portions to receive curving support force from the connecting portion at the time of forming the connecting-side protruding portion. Thus, with the vehicle frame component, at the time of forming the connecting-side protruding portion in the connecting portion, it is possible to cause the side wall-side protruding portions to receive curving support force and to advantageously form the connecting-side protruding portion. Therefore, it is possible to more advantageously avoid the above-described problem that wrinkles are formed in the steel sheet, and it is possible to provide a formed product curved in a fine arcuate shape.

T In the vehicle frame component according to the first aspect of the invention, boundary portions between the connecting portion and the two side wall portions, which are connected to each other, may be bent such that a section of the connecting portion and the two side wall portions, which intersects with the longitudinal direction of the vehicle frame component, has a U-shape. With the vehicle frame component, it is possible to provide a formed product of a steel sheet, in which the connecting portion and the two side wall portions are integrated. Thus, it is possible to simplify work at the time of forming, and it is also possible to reduce manufacturing cost by minimizing the number of components.

A manufacturing method for a vehicle frame component according to a second aspect of the invention is a manufacturing method for manufacturing the vehicle frame component according to the first aspect of the invention. The manufacturing method for a vehicle frame component includes: a processed steel sheet forming process of forming a U-shape processed steel sheet in which the two side wall portions are arranged to face each other via the connecting portion by segmenting a steel sheet as a process material into the two side wall portions and the connecting portion and then bending the boundary portions between the two side wall portions and the connecting portion; and a processed steel sheet curving process of bowing the connecting portion of the U-shape processed steel sheet into an arcuate shape by clamping the U-shape processed steel sheet, formed through the processed steel sheet forming process, between dies, wherein the processed steel sheet curving process includes: a process of forming the side wall-side protruding portions by causing portions of the two side wall portions, which are close to the boundary portions and near the connecting portion, to protrude in directions in which the two side wall portions face each other upon receiving pressing force from the dies; and a process of, at the time of bowing the connecting portion and the boundary portions, into an arcuate shape upon receiving pressing force from the dies, forming the connecting-side protruding portion by causing a middle portion of the connecting portion to protrude into a space between the two side wall portions using support force from the side wall-side protruding portions.

According to the manufacturing method for a vehicle frame component according to the second aspect of the invention, at the time of forming the vehicle frame component into an arcuate shape, it is possible to form the connecting-side protruding portion by causing the middle portion of the connecting portion to protrude into the space between the two side wall portions, and it is possible to prevent wrinkles from being formed in the steel sheet.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a mode for implementing a vehicle frame component according to an embodiment of the invention will be described with reference to the drawings. Note that the vehicle frame component according to the invention described below is a seat frame 10 that serves as a framework of a vehicle seat installed in a vehicle such as an automobile.

Figure 1:
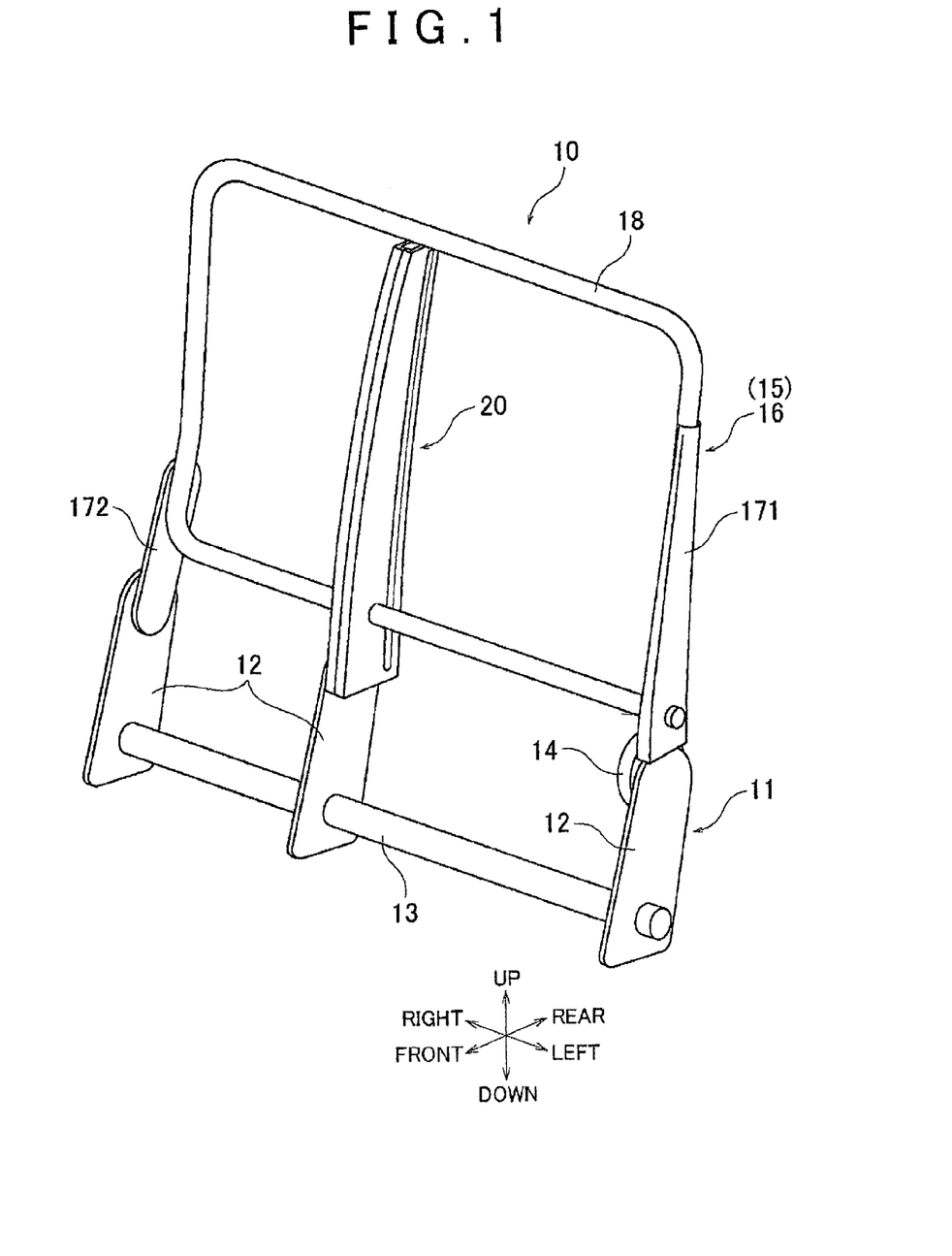
FIG. 1 is a perspective view that shows a seat frame that is part of a framework of a vehicle seat.

FIG. 1 shows the seat frame 10 that is part of a framework of a vehicle seat. The seat frame 10 shown in FIG. 1 serves as a framework of a second-row seat in a vehicle, such as a minivan, in which three rows of seats are arranged in the longitudinal direction. The seat frame 10 includes a back frame 15 that serves as a framework of a seat back that is used as a backrest for a seated occupant. The back frame 15 serves as the framework of the seat back of the second-row seat. Therefore, the back frame 15 (center frame 20) (described in detail later) is formed in an arcuate shape such that there is a wide knee space for an occupant seated in a third-row seat that is a rear seat.

The seat frame 10 shown in FIG. 1 includes a fixed frame 11 that is fixedly installed on a vehicle floor (not shown), a seat cushion (not shown), or the like, and the back frame 15 that is coupled to the fixed frame 11 so as to be pivotable relative to the fixed frame 11. The fixed frame 11 includes three upright plates 12 that are fixedly connected to the vehicle floor (not shown), and a coupling rod 13 that couples the three upright plates 12 to each other. The back frame 15 is coupled to the fixed frame 11 via a coupling device 14. The back frame 15 includes a back frame body 16 that is formed as an outer periphery, and a center frame 20 that is arranged at the center position of the back frame body 16. The back frame body 16 includes side frames 171, 172 that are coupled to the coupling device 14, and a pipe frame 18 that forms the outer periphery of the back frame 15 together with the side frames 171, 172. The left side frame 171 is coupled to the coupling device 14, and bears the load from a seated occupant. The right side frame 172 is coupled to the fixed frame 11, and bears the load from the seated occupant. In addition, the pipe frame 18 is formed to have a rectangular structure. Note that a seat pad (not shown), a seat cover (not shown), and the like, are attached to the seat frame 10 and the vehicle seat is thus formed.

Figure 2:
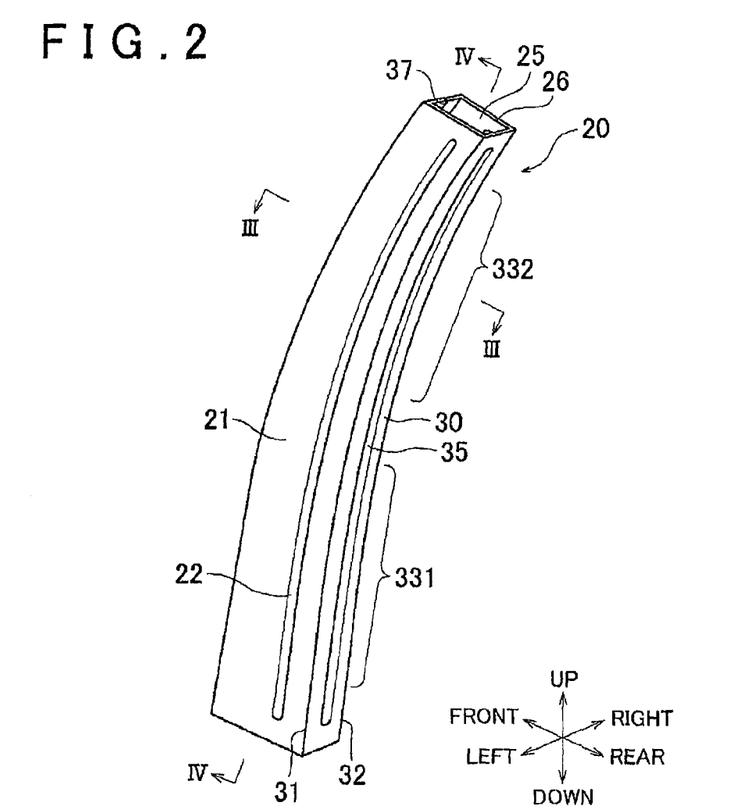
FIG. 2 is an enlarged perspective view of a center frame.
Figure 3:
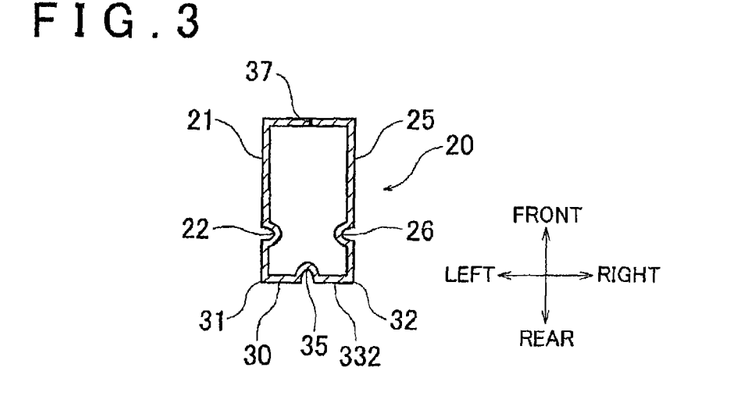
FIG. 3 is a sectional view taken along the III-III line in FIG. 2.
Figure 4:
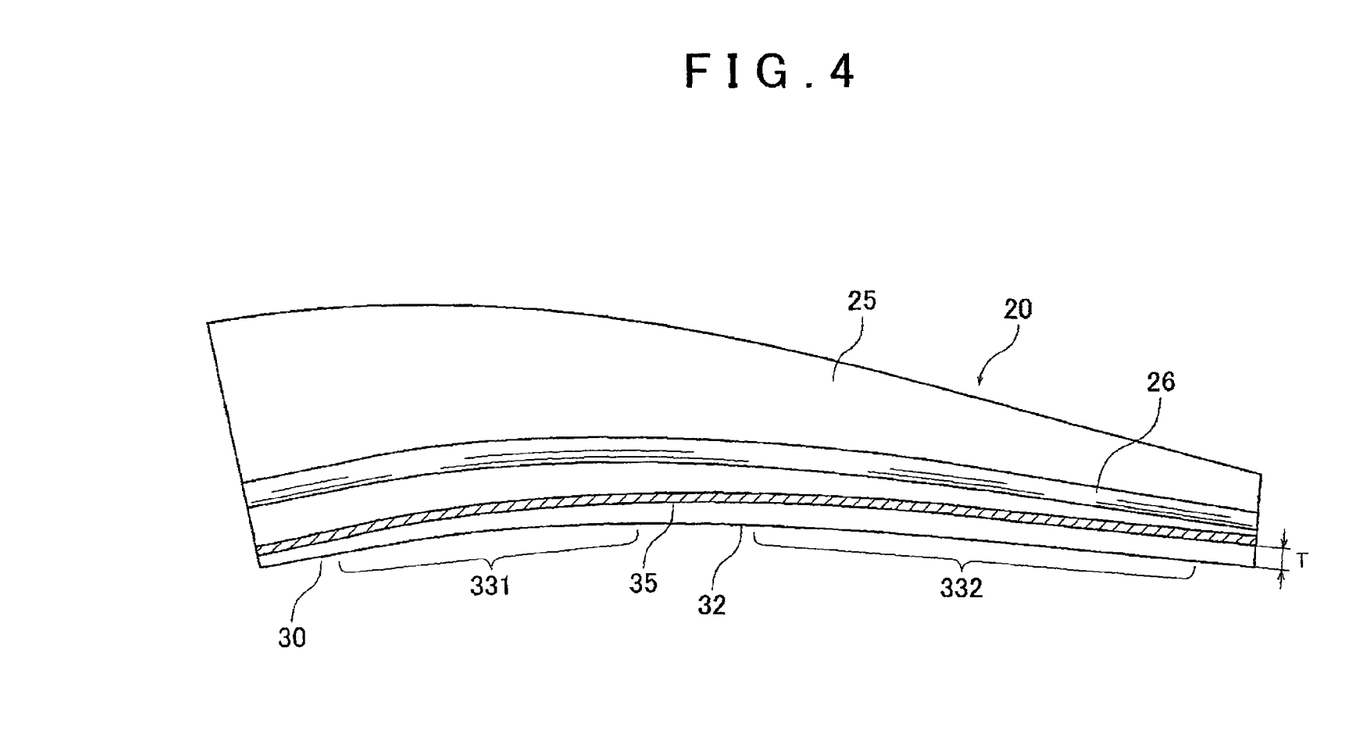
FIG. 4 is a sectional view taken along the line IV-IV in FIG. 2.

The center frame 20 is arranged at the middle position of the back frame 15 so as to extend in the up-down direction as shown in FIG. 1. The center frame 20 bears the load from the seated occupant when the seated occupant leans back on the vehicle seat. Therefore, the center frame 20 is formed, through bending, to have a substantially box-shaped structure having a U-shape or a hollow rectangular shape, so as to have higher support strength. In addition, the center frame 20 is formed in an arcuate shape such that there is a wide knee space for an occupant seated in the third-row seat that is a rear seat. FIG. 2 is an enlarged perspective view of the center frame 20. FIG. 3 is a sectional view of the center frame 20, taken along the line III-III in FIG. 2. FIG. 4 is a sectional view of the center frame 20, taken along the line IV-IV in FIG. 2.

The center frame 20 is the vehicle frame component according to the embodiment of the invention. That is, the center frame 20 is used as a frame of a vehicle component. As shown in FIG. 2 and FIG. 3, the center frame 20 has two side wall portions 21, 25 that are side walls on the left and right sides, and a connecting portion 30 that connects respective edges of the two side wall portions 21, 25, which are located on the rear side. The two side wall portions 21, 25 are arranged so as to face each other. The connecting portion 30 and the two side wall portions 21, 25 are formed to have a bent structure such that a section that intersects with the longitudinal direction (up-down direction in the drawing) of the center frame 20 forms a U-shape as shown in FIG. 3. In other words, in the center frame 20, boundary portions 31, 32 between the connected portion 30 and the two side wall portions 21, 25, which are connected to each other, are bent, and therefore the relative positions of the connecting portion 30 and the two side wall portions 21, 25 are set such that the connecting portion 30 and the two side wall portions 21, 25 extend in directions perpendicular to each other. Note that, as shown in FIG. 2 and FIG. 3, the center frame 20 is formed to have a welded portion 37 that is formed by performing bending and welding as appropriate. Therefore, the center frame 20 shown in the drawing is formed such that the connecting portion 30 and the two side wall portions 21, 25 form a U-shape in section, and a wall structure is provided by the welded portion 37 at a portion that faces the connecting portion 30 to form a hollow rectangular shape in section.

Note that, the connecting portion 30 of the center frame 20 is formed in a curved shape so as to be curved and bowed in an arcuate shape. The connecting portion 30 is formed in a curved shape that is curved and bowed in an arcuate shape such that the curved angle (curvature) of the connecting portion 30 relatively changes with respect to a longitudinal position of the center frame 20 as shown in FIG. 4. Specifically, as shown in FIG. 2 and FIG. 4, a lower connecting portion 331 (30) located at a lower portion of the center frame 20 is curved so as to form a gentle curved shape. In contrast to this, an upper connecting portion 332 (30) located at an upper portion of the center frame 20 is curved so as to form a curved shape steeper than the lower connecting portion 331 (30). In this way, the lower connecting portion 331 and the upper connecting portion 332 have curved shapes that differ in relative curve angle, and the center frame 20 as a whole is formed in a curved shape so as to be bowed in an arcuate shape and lean further rearward in the direction toward the upper side. Therefore, the lower portion of the center frame 20 is located forward of the upper portion of the center frame 20. That is, when the center frame 20 is used as the back frame 15 of the second-row seat, the lower portion of the center frame 20 is located forward of the upper portion of the center frame 20 due to the curved and bowed arcuate shape. As a result, it is possible to provide a wide knee space for the third-row seat that is a rear seat.

Here, a connecting-side protruding portion 35 is formed in the connecting portion 30. The connecting-side protruding portion 35 is formed to extend along the direction in which the connecting portion 30 extends so as to protrude into a space between the above-described two side wall portions 21, 25. Note that the protruding direction of the thus protruded connecting-side protruding portion 35 is forward direction that is opposite to the direction in which the center frame 20 having the curved and bowed arcuate shape is further leaned rearward in the direction toward the upper side as described above. As shown in FIG. 2 and FIG. 3, the connecting-side protruding portion 35 is formed as follows; a middle portion of the connecting portion 30 extends along the up-down direction and a wrinkle is tucked inward. In addition, as shown in FIG. 4, a tucked amount T of the wrinkle of the connecting-side protruding portion 35 relatively changes with respect to a longitudinal position of the center frame 20. That is, the tucked amount T of the wrinkle of the connecting-side protruding portion 35 relatively changes with respect to a longitudinal position of the center frame 20 so as to be dependent on the curved angle of the connecting portion 30 that relatively changes with respect to a longitudinal position of the above-described center frame 20. Specifically, as shown in FIG. 2 and FIG. 4, the tucked amount T of the wrinkle of the connecting-side protruding portion 35 in the upper connecting portion 332 of the center frame 20 is greater than the tucked amount T of the wrinkle of the connecting-side protruding portion 35 in the lower connecting portion 331. Meanwhile, side wall-side protruding portions 22, 26 are respectively formed in the above-described two side wall portions 21, 25, which face each other, at positions near the above-described connecting portion 30. The side wall-side protruding portions 22, 26 are respectively formed in the side wall portions 21, 25 so as to protrude inward directions, which are opposite directions, over a range in which the above-described connecting-side protruding portion 35 is formed. Specifically, as shown in FIG. 2 and FIG. 3, the left side wall-side protruding portion 22 is formed in the left side wall portion 21 over the range, in which the connecting-side protruding portion 35 is formed, so as to protrude toward the right side wall portion 25. In addition, the right side wall-side protruding portion 26 is formed in the right side wall portion 25 over the range, in which the connecting-side protruding portion 35 is formed, so as to protrude toward the left side wall portion 21.

With the above-described center frame 20 that serves as the vehicle frame component, the following operations and advantageous effects are obtained. That is, with the above-described center frame 20, because the connecting portion 30 has a curved and bowed arcuate shape, when the center frame 20 is used as the back frame 15 of the vehicle seat, it is possible to provide a wide knee space for the rear seat due to the curved and bowed arcuate shape. Here, with the above-described center frame 20, the connecting portion 30 has the connecting-side protruding portion 35 that extends along the direction in which the connecting portion 30 extends and that protrudes into the space between the two side wall portions 21, 25. Therefore, even when a high-tensile steel sheet having an extremely high strength is selected as the material of the center frame 20 and is then curved and bowed in an arcuate shape to be formed into the center frame 20, it is possible to cause a redundant portion produced through this formation to protrude into the space between the two side wall portions 21, 25 as the connecting-side protruding portion 35. In this way, when the center frame 20 is formed so as to be curved and bowed in an arcuate shape, it is possible to relieve the redundant portion so that wrinkles are not formed in the center frame 20. Therefore, even when a high-tensile steel sheet having an extremely high strength is selected as the material of the center frame 20, it is possible to produce a formed product in a fine arcuate shape without forming wrinkles in the high-tensile steel sheet.

In addition, with the above-described center frame 20, the side wall-side protruding portions 22, 26 that protrude in directions opposite to each other are formed over the range, in which the connecting-side protruding portion 35 is formed, at positions near the connecting portion 30. Therefore, at the time of forming the connecting-side protruding portion 35 in the connecting portion 30, curving support force from the connecting portion 30 at the time of forming the connecting-side protruding portion 35 is received by the side wall-side protruding portions 22, 26. Therefore, with the above-described center frame 20, at the time of forming the connecting-side protruding portion 35 in the connecting portion 30, it is possible to cause the side wall-side protruding portions 22, 26 to receive curving support force and to advantageously form the connecting-side protruding portion 35. Thus, it is possible to more advantageously avoid the above-described problem that wrinkles are formed in the high-tensile steel sheet, and it is possible to provide a fine arcuate formed product. In addition, with the above-described center frame 20, because the boundary portions 31, 32 between the connecting portion 30 and the two side wall portions 21, 25, which are connected to each other, are bent such that the section of the connecting portion 30 and the two side wall portions 21, 25, which intersects with the longitudinal direction of the center frame 20, forms a U-shape, it is possible to provide a formed product made of a high-tensile steel sheet in which the connecting portion 30 and the two side wall portions 21, 25 are integrated with each other. In this way, it is possible to simplify work at the time of forming, and it is also possible to reduce manufacturing cost by minimizing the number of components.

Figure 5:
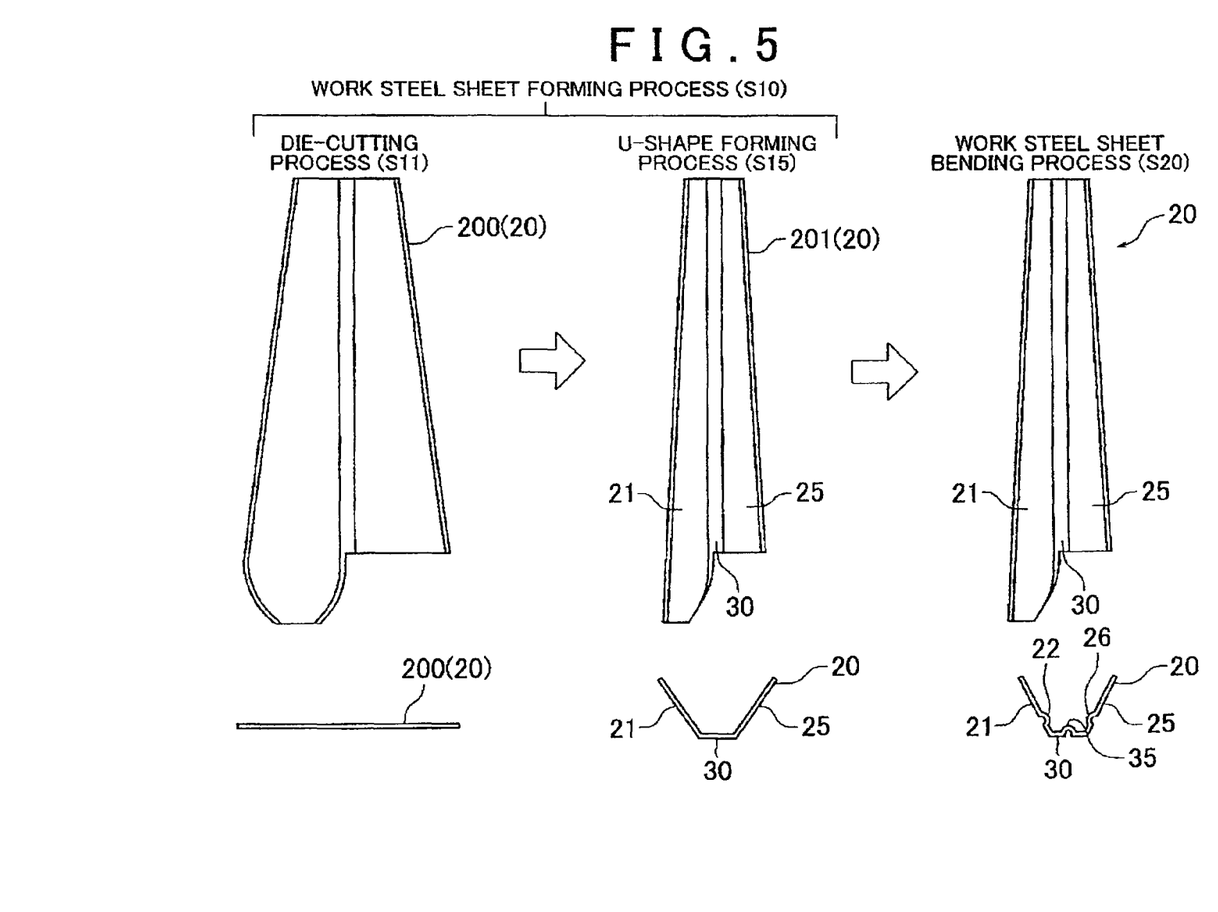
FIG. 5 is a frame manufacturing schematic process chart that shows the schematic procedure of a frame manufacturing process.

Next, a manufacturing method for manufacturing the above-described center frame 20 that serves as the vehicle frame component according to the invention will be described. Note that FIG. 5 is a frame manufacturing schematic process chart that shows the schematic procedure of a frame manufacturing process. In FIG. 5, the upper-side drawing is a front view, and the lower-side drawing is a view seen from the plate thickness direction. As shown in FIG. 5, the above-described manufacturing method for the center frame 20 includes a processed steel sheet forming process (S10) and a processed steel sheet curving process (S20) that is performed after the processed steel sheet forming process (S10). Note that the manufacturing method for the center frame 20 includes various processes in addition to these processes (S10 and S20). The processed steel sheet forming process (S10) includes a stamping process (S11) and a U-shape forming process (S15). The stamping process (S11) is a process in which an outer shape of a steel sheet that is a process material is stamped. Through the stamping process (S11), as shown in the drawing, a stamped steel sheet 200 that has not been subjected to a bending process is formed. Note that a high-tensile steel sheet having an extremely high strength and called "high-tensile material" is selected as the steel sheet that is used as the process material. The U-shape forming process (S15) is a process in which the processed steel sheet 200 of which the outer shape has been stamped in the above-described stamping process (S11) is bent as a U-shape processed steel sheet 201. Specifically, the U-shape forming process (S15) is a process in which the processed steel sheet 200 that has been stamped in the stamping process (S11) is segmented into the two side wall portions 21, 25 and the connecting portion 30 and the boundary portions between the two side wall portions 21, 25 and the connecting portion 30 are bent. Through the U-shape forming process (S15), as shown in the drawing, a U-shape processed steel sheet 201 in which the two side wall portions 21, 25 are arranged so as to face each other via the connecting portion 30 is formed. Note that, as shown in the drawing, the U-shape processed steel sheet 201 has a shape close to a tapered shape of which the open-side of the U shape is expanded. Note that, as in the U-shape processed steel sheet 201, when the open side of the U shape is expanded, press working becomes easy in the subsequent processed steel sheet curving process (S20).

Figure 6:
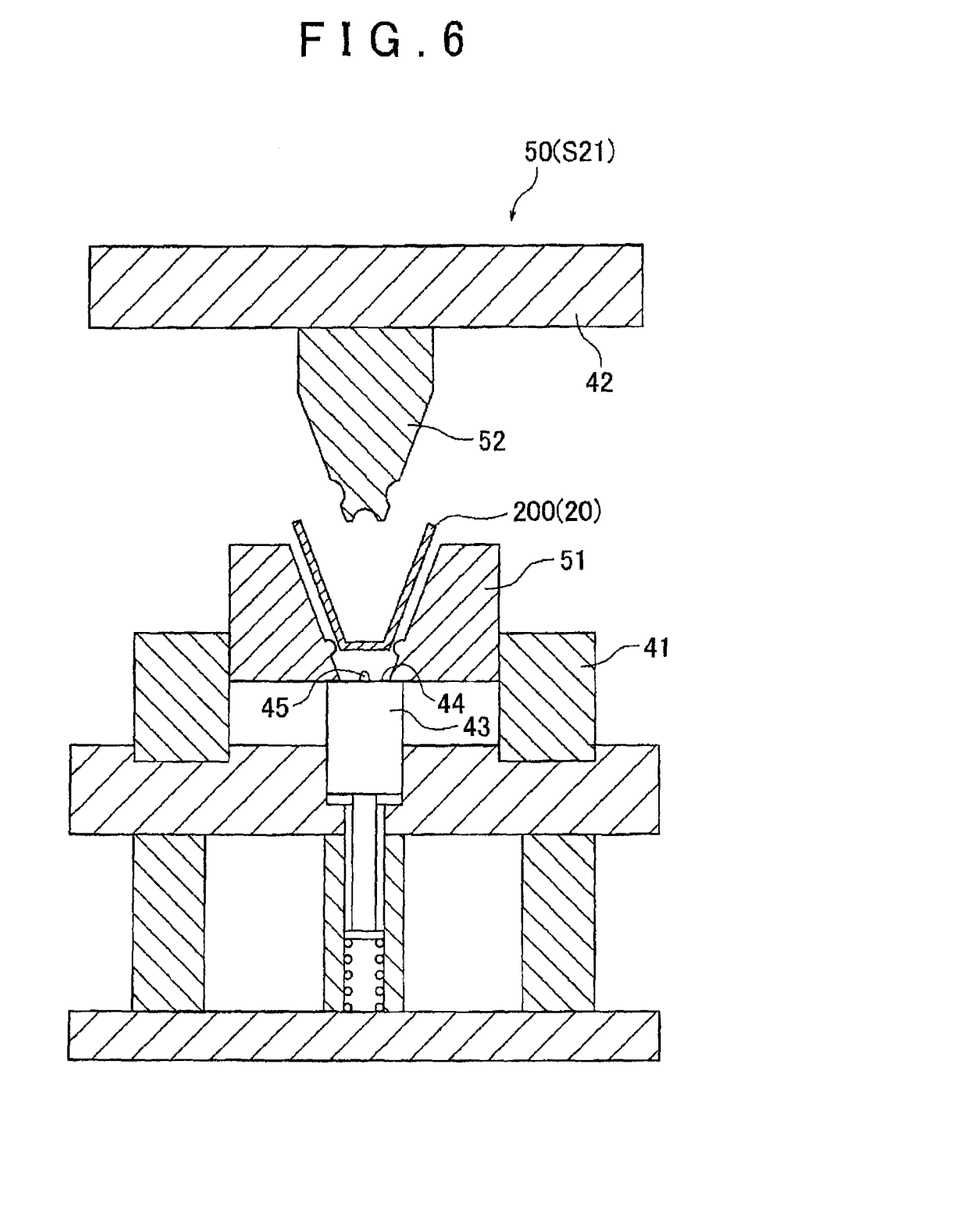
FIG. 6 is a view that shows a first working process that is a concrete forming step in a processed steel sheet curving process.
Figure 7:
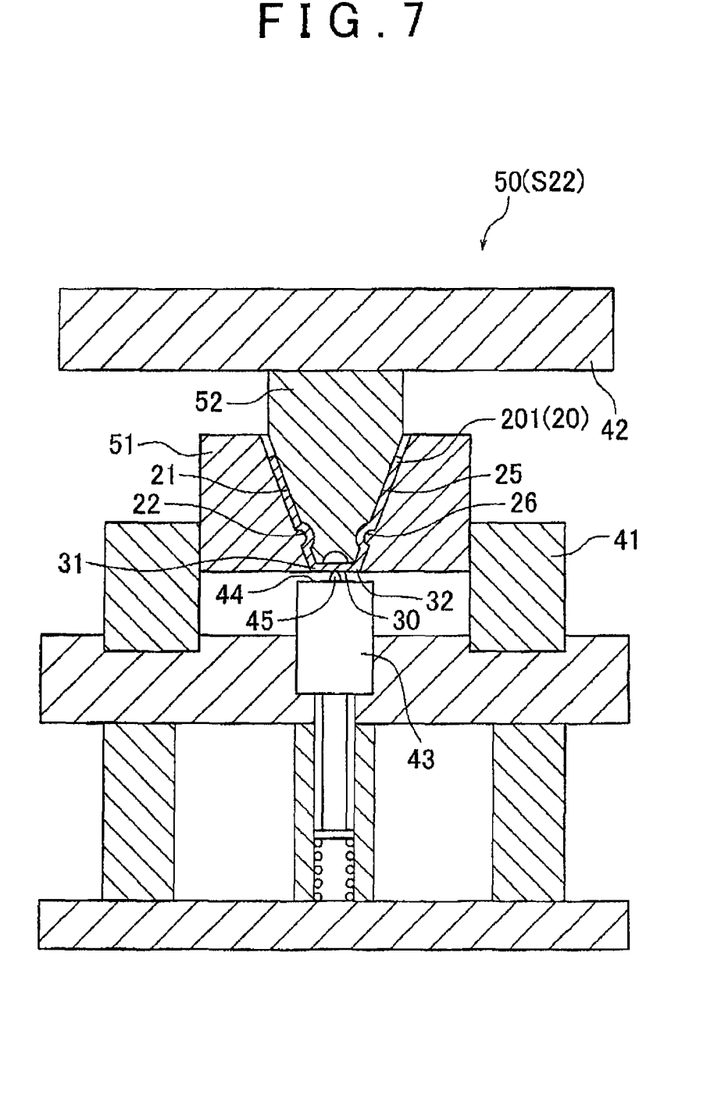
FIG. 7 is a view that shows a second working process that is a concrete forming step in the processed steel sheet curving process.
Figure 8:
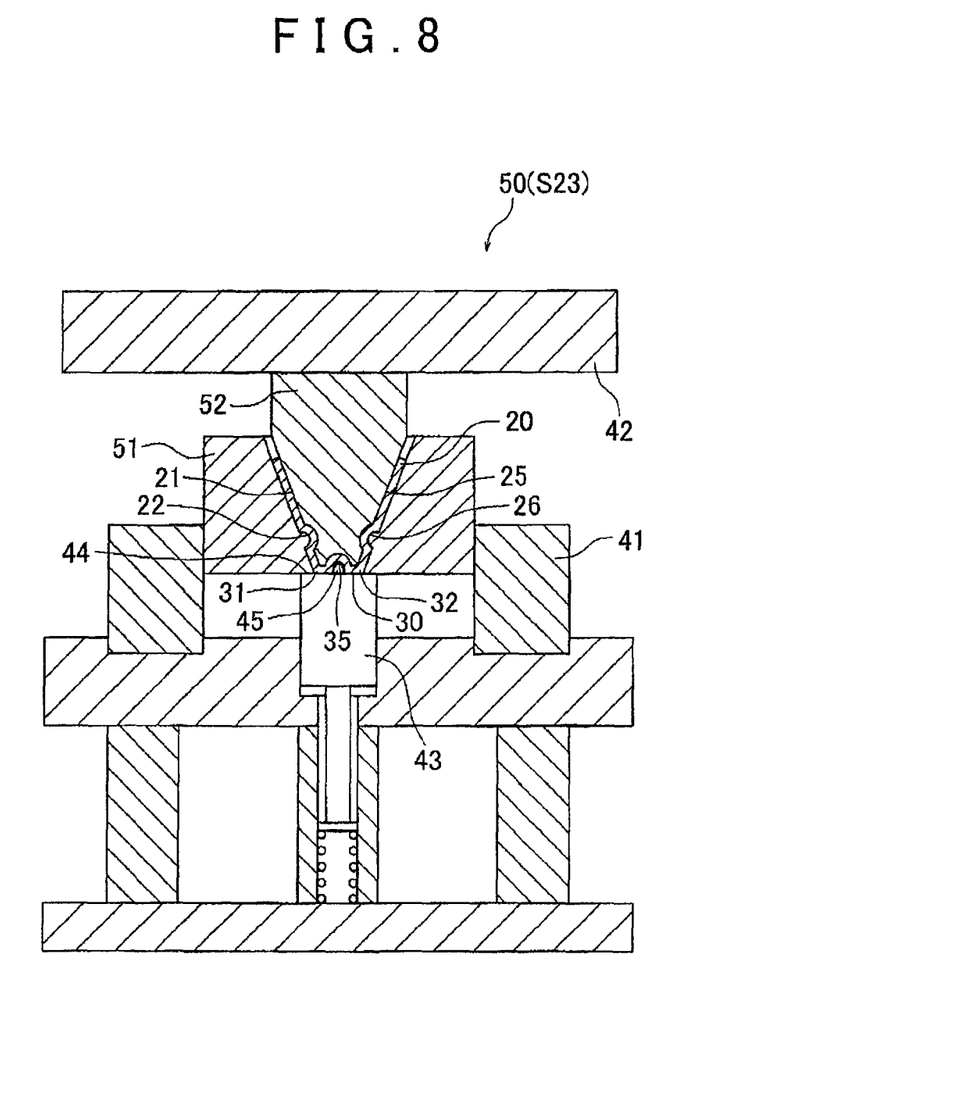
FIG. 8 is a view that shows a third working process that is a concrete forming step in the processed steel sheet curving process.

In the processed steel sheet curving process (S20), press working is performed according to the process sequence shown in FIG. 6 to FIG. 8. Note that FIG. 6 to FIG. 8 are views that show concrete steps in the processed steel sheet curving process (S20). FIG. 6 is a view showing a first working process (S21) of the processed steel sheet curving process, FIG. 7 is a view showing a second working process (S22) of the processed steel sheet curving process, and FIG. 8 is a view showing a third working process (S23) of the processed steel sheet curving process. As shown in FIG. 5, the processed steel sheet curving process (S20) is a process in which the U-shape processed steel sheet 201 formed through the above-described processed steel sheet forming process (S10) is clamped between dies to cause the connecting portion 30 of the U-shape processed steel sheet 201 to be bowed in an arcuate shape. Specifically, as shown in FIG. 6, in the first working process (S21) of the processed steel sheet curving process (S20), the U-shape processed steel sheet 201 formed through the above-described processed steel sheet forming process (S10) is clamped between a lower die 51 and an upper die 52 of a pressing machine 50. Note that the reference numeral 41 in the drawing denotes a base, and the lower die 51 is connected to the base 41. The reference numeral 42 in the drawing denotes a movable base 42, and the upper die 52 is connected to the movable base 42. The reference numeral 43 in the drawing denotes a press working mechanism, and is a mechanism that curves and bows the connecting portion 30 and the boundary portions 31, 32 into an arcuate shape upon receiving pressing force.

Subsequently, as shown in FIG. 7, in the second working process (S22) of the processed steel sheet curving process (S20), the U-shape processed steel sheet 201 between the above-described lower die 51 and upper die 52 is subjected to first press working. In the first press working, the U-shape processed steel sheet 201 receives pressing force from the lower die 51 and the upper die 52, and forms the side wall-side protruding portions 22, 26 in the two side wall portions 21, 25 near the boundary portions 31, 32. The side wall-side protruding portions 22, 26 protrude in directions in which the two side wall portions 21, 25 face each other. Note that the thus protruded side wall-side protruding portions 22, 26 are formed in shapes corresponding to die shapes formed on the above-described lower die 51 and upper die 52. That is, the side wall-side protruding portions 22, 26 are formed in the side wall portions 21, 25 that match projections and recesses formed in these lower die 51 and upper die 52 through press working in which the U-shape processed steel sheet 201 is clamped by the lower die 51 and the upper die 52.

In addition, as shown in FIG. 8, in the third working process (S23) of the processed steel sheet curving process (S20), in a state where the side wall-side protruding portions 22, 26 are formed in the above-described second working process (S22), the U-shape processed steel sheet 201 is subjected to second press working by the press working mechanism 43. In the second press working, a forming face 44 of the press working mechanism 43 is brought into contact with the U-shape processed steel sheet 201 clamped between the lower die 51 and the upper die 52. When the forming face 44 of the press working mechanism 43 is brought into contact with the connecting portion 30 of the U-shape processed steel sheet 201 in this way, the forming face 44 of the press working mechanism 43 curves and bows the connecting portion 30 and the boundary portions 31, 32 into an arcuate shape. That is, the forming face 44 of the press working mechanism 43 brings a tucking protrusion 45 of the press working mechanism 43 into contact with the middle portion of the connecting portion 30 while firmly bending the boundary portions 31, 32 of the U-shape processed steel sheet 201. Thus, the connecting-side protruding portion 35 is formed by the redundant portion produced in a range from the side wall-side protruding portions 22, 26 to the connecting portion 30, which is produced through firm bending of the boundary portions 31, 32. That is, the redundant portion produced in the range from the side wall-side protruding portions 22, 26 to the connecting portion 30 is tucked inward by the contact with the tucking protrusion 45 of the press working mechanism 43 so as to protrude from the middle portion of the connecting portion 30 into the space between the two side wall portions 21, 25. In this way, the connecting-side protruding portion 35 protruding into the space between the two side wall portions 21, 25 is formed in the connecting portion 30.

Note that, the tucked amount T of the wrinkle of the connecting-side protruding portion 35 does not correspond to the size of the tucking protrusion 45 of the press working mechanism 43. Although it is not apparent from FIG. 8, the tucked amount of the connecting-side protruding portion 35 is larger than the protruded amount of the tucking protrusion 45. That is, at the time of forming the connecting portion 30 and the boundary portions 31, 32 into an arcuate shape upon receiving pressing force from the lower die 51 and the upper die 52, the middle portion of the connecting portion 30 is protruded into the space between the two side wall portions 21, 25 upon receiving support force from the formed side wall-side protruding portions 22, 26, thus forming the connecting-side protruding portion 35. Therefore, the tucked amount T of the wrinkle of the connecting-side protruding portion 35 depends on the amount of the redundant portion produced in the range from the side wall-side protruding portions 22, 26 to the connecting portion 30, and, specifically, depends on the curve angle of the connecting portion 30 that relatively changes with respect to a longitudinal position of the center frame 20. That is, as shown in FIG. 4, the tucked amount T of the wrinkle of the connecting-side protruding portion 35 in the upper connecting portion 332 of the center frame 20 is greater than the tucked amount T of the wrinkle of the connecting-side protruding portion 35 in the lower connecting portion 331. Although not shown in the drawing, after the above-described processed steel sheet forming process (S10) and processed steel sheet curving process (S20), a hollow rectangular shape forming process is performed. In the hollow rectangular shape forming process, within the center frame 20 shown in FIG. 8, the edges of the left and right side wall portions 21, 25 are bent inward so as to face each other and welded together. That is, as in the center frame 20 shown in FIG. 2 and FIG. 3, the connecting portion 30 and the two side wall portions 21, form a U-shape in section, and a wall structure is provided by the welded portion 37 at a portion that faces the connecting portion 30 to form a hollow rectangular shape in section.

According to the above-described manufacturing method for manufacturing the center frame 20, the following operations and advantageous effects are obtained. That is, according to the above-described manufacturing method for the center frame 20, at the time of forming the connecting portion 30 and the boundary portions 31, 32 into an arcuate shape upon receiving pressing force from the dies 51, 52, the middle portion of the connecting portion 30 is protruded into the space between the two side wall portions 21, 25 upon receiving support force from the formed side wall-side protruding portions 22, 26, thus forming the connecting-side protruding portion 35. In this way, at the time of forming the center frame 20 into an arcuate shape, it is possible to form the connecting-side protruding portion 35 by causing the middle portion of the connecting portion 30 to protrude into the space between the two side wall portions 21, 25, and it is possible to prevent wrinkles from being formed in the high-tensile steel sheet. Note that the above-described manufacturing method for the center frame 20 describes main processes, and the above-described center frame 20 is formed by including an appropriate treatment process, or the like.

Note that the vehicle frame component according to the invention is not limited to the above-described embodiment, and may be formed by making modifications to the above-described embodiment as needed. That is, in the above-described embodiment, the seat frame 10 that serves as the framework of the vehicle seat installed in the vehicle such as an automobile is described as an example of the vehicle frame component according to the invention. However, the vehicle frame component according to the invention is not limited to the above-described embodiment, and may be a frame component that is used as a framework of the vehicle as typified by a pillar and a member, and the invention may be applied to all the frame components of the vehicle, which are curved and bowed in an arcuate shape from a steel sheet having an extremely high strength, such as a high-tensile steel sheet, selected as a material.

What is claimed is:

1. A vehicle frame component comprising:
   two side wall portions arranged to face each other and
   a connecting portion that connects edges of the two side wall portions, and that forms a framework of a vehicle component,
   wherein a connecting-side protruding portion that protrudes into a space between the two side wall portions while extending along a direction in which the connecting portion extends is formed in at least part of the connecting portion, and at least part of the connecting portion is formed in a shape in which the connecting portion is curved in an arcuate shape and leaned in a direction opposite to a direction in which the connecting-side protruding portion protrudes,
   wherein side wall-side protruding portions that protrude in opposite directions are formed in the two respective side wall portions over a range, in which the connecting-side protruding portion is formed, at positions near the connecting portion,
   wherein the side wall-side protruding portions protrude inwardly into the space between the two side wall portions.

2. The vehicle frame component according to claim 1, wherein boundary portions between the connecting portion and the two side wall portions, which are connected to each other, are bent such that a section of the connecting portion and the two side wall portions, which intersects with a longitudinal direction of the vehicle frame component, has a U-shape.

3. A manufacturing method for manufacturing the vehicle frame component according to claim 2, comprising:
   a processed steel sheet forming process of forming a U-shape processed steel sheet in which the two side wall portions are arranged to face each other via the connecting portion by segmenting a steel sheet as a process material into the two side wall portions and the connecting portion and then bending the boundary portions between the two side wall portions and the connecting portion; and
   a processed steel sheet curving process of bowing the connecting portion of the U-shape processed steel sheet into an arcuate shape by clamping the U-shape processed steel sheet, formed through the processed steel sheet forming process, between dies, wherein
   the processed steel sheet curving process includes:
   a process of forming the side wall-side protruding portions by causing portions of the two side wall portions, which are close to the boundary portions and near the connecting portion, to protrude in directions in which the two side wall portions face each other upon receiving pressing force from the dies; and
   a process of, at the time of bowing the connecting portion and the boundary portions into an arcuate shape using pressing force from the dies, forming the connecting-side protruding portion by causing a middle portion of the connecting portion to protrude into a space between the two side wall portions upon receiving support force from the formed side wall-side protruding portions.

\* \* \* \* \*